United States Patent
Sandberg et al.

(10) Patent No.: US 11,116,000 B2
(45) Date of Patent: Sep. 7, 2021

(54) PROACTIVE PUSCH GRANTS TO PREVENT RATE THROTTLING

(71) Applicant: CommScope Technologies LLC, Hickory, NC (US)

(72) Inventors: Stuart D. Sandberg, Acton, MA (US); Nandish Chalishazar, Nashua, NH (US)

(73) Assignee: CommScope Technologies LLC, Hickory, NC (US)

( * ) Notice: Subject to any disclaimer, the term of this patent is extended or adjusted under 35 U.S.C. 154(b) by 114 days.

(21) Appl. No.: 16/405,801

(22) Filed: May 7, 2019

(65) Prior Publication Data
US 2019/0349981 A1     Nov. 14, 2019

Related U.S. Application Data

(60) Provisional application No. 62/668,732, filed on May 8, 2018.

(51) Int. Cl.
*H04W 72/14* (2009.01)
*H04W 72/12* (2009.01)
(Continued)

(52) U.S. Cl.
CPC ........... *H04W 72/14* (2013.01); *H04L 5/0007* (2013.01); *H04L 5/0055* (2013.01);
(Continued)

(58) Field of Classification Search
CPC ............. H04W 72/14; H04W 72/1252; H04W 28/0289; H04W 80/06; H04L 5/0007;
(Continued)

(56) References Cited

U.S. PATENT DOCUMENTS

| | | | |
|---|---|---|---|
| 2004/0174838 A1 | 9/2004 | Sillasto | |
| 2006/0094367 A1* | 5/2006 | Miyoshi | H04L 1/0016 455/67.11 |

(Continued)

FOREIGN PATENT DOCUMENTS

| | | |
|---|---|---|
| EP | 2557882 A1 | 2/2013 |
| KR | 20170089097 A | 8/2017 |

(Continued)

OTHER PUBLICATIONS

International Searching Authority, "International Search Report and Written Opinion from PCT Application No. PCT/US2019/031179 dated Aug. 23, 2019", from Foreign Counterpart to U.S. Appl. No. 16/405,801, pp. 1-11, Published: WO.

(Continued)

*Primary Examiner* — Ashley Shivers
(74) *Attorney, Agent, or Firm* — Fogg & Powers LLC

(57) ABSTRACT

One embodiment is directed to transmitting user data to a UE from a base station on a shared downlink channel and determining if a throughput for the user data transmitted to the UE on the shared downlink channel is greater than a threshold amount. If the throughput for the user data transmitted to the UE on the shared downlink channel is greater than the threshold amount, the base station provides the UE with a minimum amount of access to a shared uplink channel by making proactive grants of uplink resources when such UE is more in need of a proactive grant than other UEs. Other embodiments are disclosed.

34 Claims, 3 Drawing Sheets

(51) Int. Cl.
*H04L 5/00* (2006.01)
*H04W 28/02* (2009.01)
*H04W 80/06* (2009.01)

(52) U.S. Cl.
CPC ... *H04W 28/0289* (2013.01); *H04W 72/1252* (2013.01); *H04W 80/06* (2013.01)

(58) Field of Classification Search
CPC ... H04L 5/0055; H04L 5/0091; H04L 5/0044; H04L 5/0058
See application file for complete search history.

(56) References Cited

U.S. PATENT DOCUMENTS

| | | |
|---|---|---|
| 2007/0140165 A1 | 6/2007 | Kim et al. |
| 2011/0009116 A1 | 1/2011 | Moberg et al. |
| 2011/0292901 A1 | 12/2011 | Pettersson et al. |
| 2012/0327799 A1 | 12/2012 | Sandlund et al. |
| 2013/0028220 A1 | 1/2013 | Andreozzi et al. |
| 2013/0034014 A1 | 2/2013 | Jonsson et al. |
| 2013/0065562 A1 | 3/2013 | Singh |
| 2013/0170461 A1 | 7/2013 | Ren |
| 2013/0225218 A1 | 8/2013 | Arthur et al. |
| 2015/0223184 A1 | 8/2015 | Bergström et al. |
| 2015/0245326 A1 | 8/2015 | Rune et al. |
| 2016/0066276 A1 | 3/2016 | Su et al. |
| 2016/0278113 A1 | 9/2016 | Sandberg et al. |
| 2016/0366704 A1 | 12/2016 | Lee et al. |
| 2017/0019914 A1 | 1/2017 | Rune et al. |
| 2017/0105231 A1 | 4/2017 | Jersenius et al. |
| 2017/0303273 A1 | 10/2017 | Jin et al. |
| 2019/0124571 A1 | 4/2019 | Kong et al. |
| 2019/0349982 A1 | 11/2019 | Kompella et al. |
| 2020/0145125 A1* | 5/2020 | Wang ............... H04L 5/006 |

FOREIGN PATENT DOCUMENTS

| | | |
|---|---|---|
| WO | 2011044494 A1 | 4/2011 |
| WO | 2018077425 A1 | 5/2018 |

OTHER PUBLICATIONS

International Searching Authority, "International Search Report and Written Opinion from PCT Application No. PCT/US2019/031187 dated Aug. 23, 2019", from Foreign Counterpart to U.S. Appl. No. 16/405,830 , pp. 1-11, Published: WO.

U.S. Patent and Trademark Office, "Office Action", U.S. Appl. No. 16/405,830, dated Dec. 8, 2020, p. 1 through 19, Published: US.

International Bureau, "International Preliminary Report on Patentability from PCT Application No. PCT/US2019/031187", from Foreign Counterpart to U.S. Appl. No. 16/405,830, dated Nov. 19, 2020, p. 1 through 8, Published: WO.

International Bureau, "International Preliminary Report on Patentability from PCT Application No. PCT/US2019/031179", from Foreign Counterpart to U.S. Appl. No. 16/405,801, dated Nov. 19, 2020, p. 1 through 8, Published: WO.

U.S. Patent and Trademark Office, "Restriction Requirement", U.S. Appl. No. 16/405,830, dated Sep. 8, 2020, pp. 1 through 4, Published: US.

* cited by examiner

PROACTIVE PUSCH GRANTS TO PREVENT RATE THROTTLING

CROSS-REFERENCE TO RELATED APPLICATION

This application claims the benefit of U.S. Provisional Patent Application Ser. No. 62/668,732, filed on May 8, 2018, and titled "PROACTIVE PUSCH GRANTS TO PREVENT RATE THROTTLING", which is hereby incorporated herein by reference.

BACKGROUND

In Long Term Evolution (LTE) wireless systems, the Physical Uplink Shared Channel (PUSCH) is defined as a shared channel. In order for user equipment (UE) to transmit on the PUSCH, the UE typically transmits a scheduling request (SR) to the serving base station (also referred to as an "Evolved Node B" or "eNodeB") on the Physical Uplink Control Channel (PUCCH).

In response to the SR, if appropriate, the serving eNodeB will grant the UE PUSCH resources for transmitting on the PUSCH. Typically, each SR informs the eNodeB that the UE needs access to the PUSCH but does not indicate how much data the UE needs to transmit on the PUSCH. As a result, the eNodeB will grant the UE a nominal amount of PUSCH resources by sending the UE a DCI0 message on the PDCCH.

This nominal PUSCH grant includes sufficient PUSCH resources for the UE to send a Buffer Status Report (BSR) and a Power Headroom Report (PHR) on the PUSCH but not the uplink data buffered at the UE. The BSR indicates how much uplink data the UE has buffered from transmission on the PUSCH. In response to receiving the BSR from the UE, the eNodeB makes one or more subsequent PUSCH grants to the UE (signaled using DCI0 messages) for transmitting the buffered uplink data on the PUSCH. The BSR value is used by the eNodeB to track the amount of buffered data that remains at the UE for the most-recent SR. For each PUSCH grant, after the eNodeB successfully receives uplink data from the UE on the PUSCH, the tracked BSR value is reduced by the amount of data successfully received. The eNodeB stops making PUSCH grants to the UE for the most-recent SR once the tracked BSR value reaches zero.

The eNodeB typically assigns some of the connected UEs periodic PUCCH resource blocks (RBs) during which the UEs can make SRs. UEs that are not assigned periodic PUCCH RBs for making SRs must use the Random Access Channel (RACH) procedure to make SRs. For each UE assigned PUCCH RBs for making SRs, the eNodeB assigns a configurable period (Tsr) that specifies the length between successive PUCCH RBs assigned to that UE to make SR transmissions.

When a relatively large number of PUCCH RBs are assigned to UEs for SRs, the payload capacity of the PUCCH will be reduced. Thus, when the number of connected UEs is high, the eNodeB will typically assign relatively large Tsr values to at least some of the connected UEs in order to keep the number of PUCCH RBs used for SRs small.

However, using large Tsr values can limit the Physical Downlink Shared Channel (PDSCH) throughput for UEs communicating using Transmission Control Protocol (TCP) connections that do not have uplink traffic. In general, a TCP source will throttle downlink throughput based on its reception of uplink acknowledgments (ACKs) for downlink packets. In particular, the TCP source limits the number of bytes in flight. This causes downlink TCP throughput to decrease when TCP ACK latency increases.

When a UE communicating using a TCP connection is not transmitting uplink user data over the TCP connection, the UE will not have otherwise been granted PUSCH RBs for transmitting uplink TCP data. Therefore, in order for the UE to be granted PUSCH RBs to send TCP ACKS, the UE typically must send a SR at its next SR transmission opportunity. However, increasing the Tsr value assigned to the UE will increase the time it takes for the UE to be granted PUSCH RBs for transmitting TCP ACKS. This will increase the TCP ACK latency and, as a result, can result in the TCP source throttling the downlink throughput.

SUMMARY

One embodiment is directed to a method performed by a base station in connection with communicating with user equipment (UE). The method comprises transmitting user data to the UE from the base station on a shared downlink channel and determining if a throughput for the user data transmitted to the UE on the shared downlink channel is greater than a threshold amount. The method further comprises, if the throughput for the user data transmitted to the UE on the shared downlink channel is greater than the threshold amount, providing, by the base station, the UE with a minimum amount of access to a shared uplink channel by making proactive grants of uplink resources when necessary.

Another embodiment is directed to a method performed by a base station used to wirelessly communicate with user equipment using an LTE shared downlink channel and an LTE shared uplink channel. The method comprises transmitting respective user data to each UE from the base station on the shared downlink channel, determining, by the base station, a respective average throughput for the respective user data transmitted on the shared downlink channel to each UE, and determining, by the base station, if the respective average throughput for each UE exceeds a predetermined throughput threshold. The method further comprises, for each UE for which the respective average throughput exceeds the predetermined throughput threshold, determining, by the base station, a number of time transmission intervals (TTIs) that have passed since a most recent grant of, or scheduling request (SR) opportunity for, uplink resources on the shared uplink channel for the UE, determining, by the base station, which UE has a largest said number of TTIs, determining, by the base station, if the largest said number of TTIs is greater than a threshold number of TTIs, and, if the largest said number of TTIs is greater than a threshold number of TTIs, making, by the base station to the UE associated with the largest said number of TTIs, a proactive grant of uplink resources on the shared uplink channel.

Another embodiment is directed to a base station configured to wirelessly communicate with user equipment (UE). The base station comprises a radio configured to wirelessly communicate with the UE and at least one processor configured to cause the base station to do the following: transmit user data to the UE from the base station on a shared downlink channel; determine if a throughput for the user data transmitted to the UE on the shared downlink channel is greater than a threshold amount; and, if the throughput for the user data transmitted to the UE on the shared downlink channel is greater than the threshold amount, provide the UE with a minimum amount of access to shared uplink channel by making proactive grants of uplink resources when necessary.

Another embodiment is directed to a base station configured to wirelessly communicate with user equipment (UE) using an LTE shared downlink channel and an LTE shared uplink channel. The base station comprises a radio configured to wirelessly communicate with the UE and at least one processor configured to cause the base station to do the following: transmit respective user data to each UE from the base station on the shared downlink channel; determine a respective average throughput for the respective user data transmitted on the shared downlink channel to each UE; and determine if the respective average throughput for each UE exceeds a predetermined throughput threshold. The at least one processor is further configured to cause the base station to do the following: for each UE for which the respective average throughput exceeds the predetermined throughput threshold, determine a number of time transmission intervals (TTIs) that have passed since a most recent of a grant of, or scheduling request (SR) opportunity for, uplink resources on the shared uplink channel for the UE; determine which UE has a largest said number of TTIs; determine if the largest said number of TTIs is greater than a threshold number of TTIs; and if the largest said number of TTIs is greater than a threshold number of TTIs, make, to the UE associated with the largest said number of TTIs, a proactive grant of uplink resources on the shared uplink channel.

DRAWINGS

Figure 3:
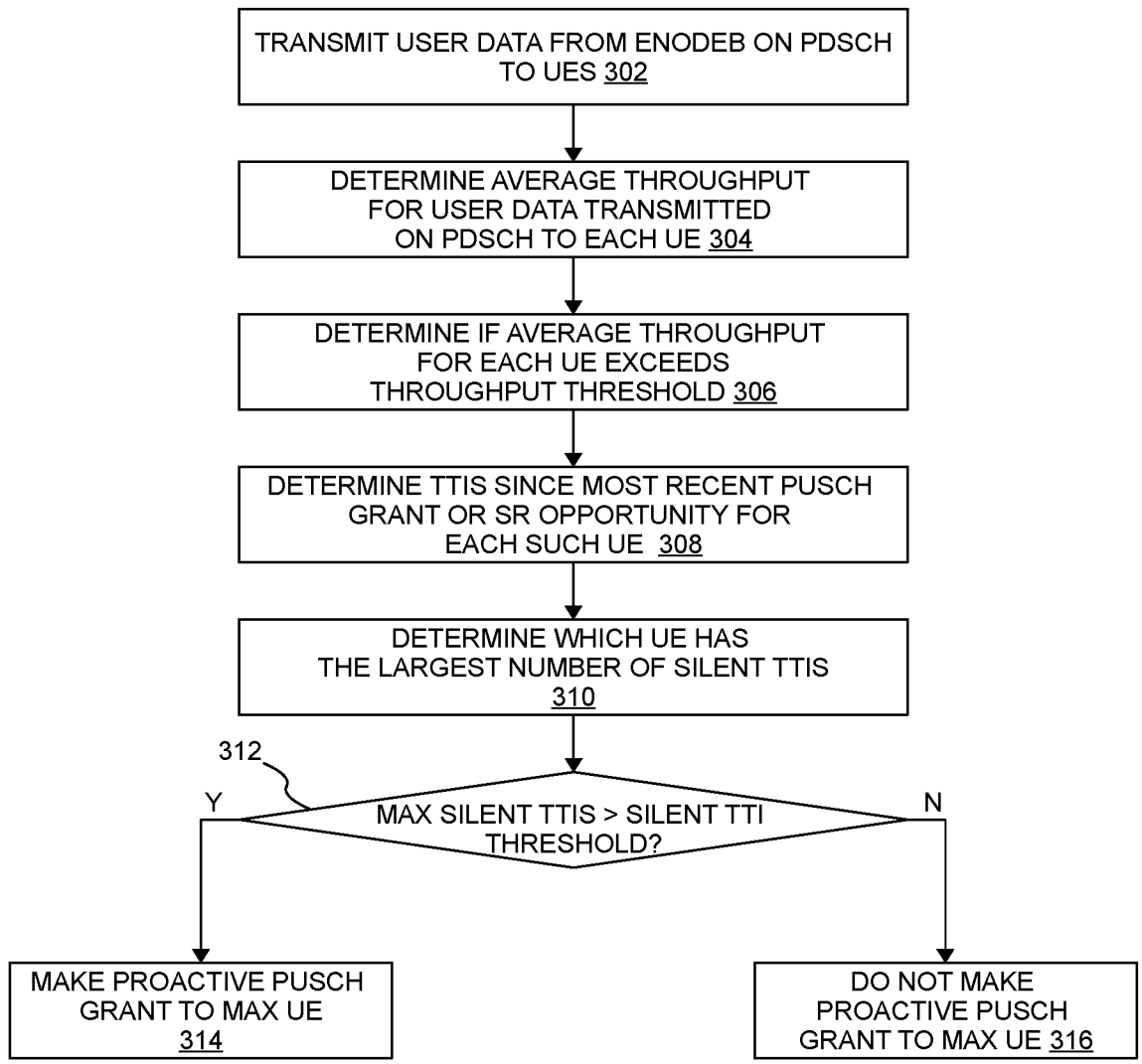

FIG. 3 comprises a flow chart illustrating one exemplary embodiment of a method of proactively granting access to the PUSCH.

Like reference numbers and designations in the various drawings indicate like elements.

DETAILED DESCRIPTION

Figure 1:
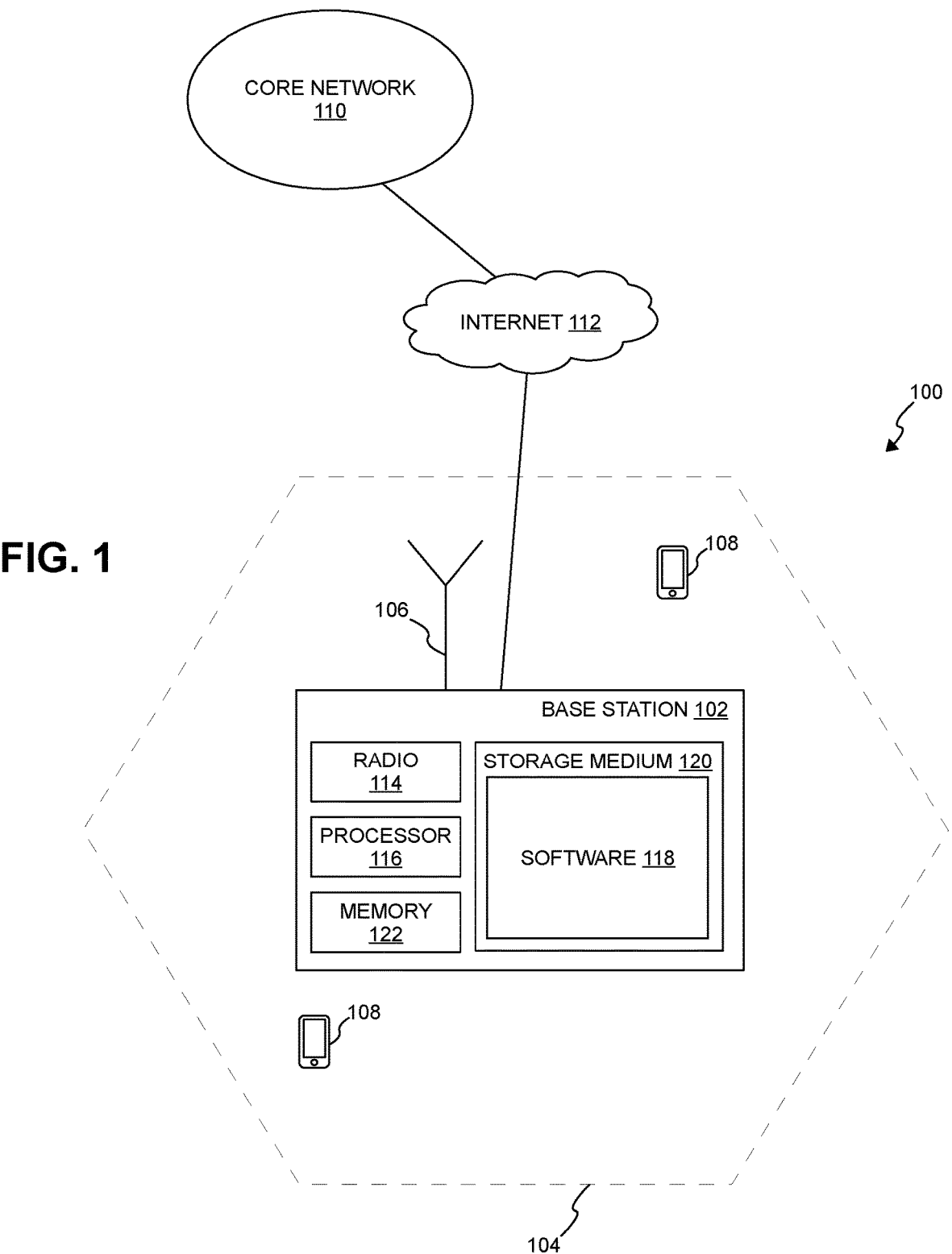
FIG. 1 is a block diagram illustrating one exemplary embodiment of a radio access network (RAN) system in which the techniques described here can be implemented.

FIG. 1 is a block diagram illustrating one exemplary embodiment of a radio access network (RAN) system 100 in which the techniques described here can be implemented.

The RAN system 100 comprises one or more base stations 102 (also referred to here as "Evolved Node Bs" or "eNodeBs"). Each eNodeB 102 serves at least one cell 104 and includes or is coupled to one or more antennas 106 via which downlink RF signals are radiated to user equipment (UE) 108 and via which uplink RF signals transmitted by UEs 108 are received.

Each eNodeB 102 is coupled to a core network 110 of a wireless network operator over an appropriate back-haul. In the exemplary embodiment shown in FIG. 1, the Internet 112 is used for back-haul between each eNodeB 102 and each core network 110. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, each eNodeB 102 implements an LTE Evolved Node B that is used to provide the user equipment 108 with mobile access to the wireless network operator's core network 110 to enable the user equipment 108 to wirelessly communicate data and voice (using, for example, Voice over LTE (VoLTE) technology).

Also, in this exemplary LTE embodiment, each core network 110 is implemented as an LTE Evolved Packet Core (EPC) 110 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Each eNodeB 102 can be implemented in various ways. For example, each eNodeB 102 can be implemented using a traditional monolithic macro base station configuration, a microcell, picocell, femtocell or other "small cell" configuration, or a centralized or cloud RAN (C-RAN) configuration. Each eNodeB 102 can be implemented in other ways.

Also, in the exemplary embodiment shown in FIG. 1, each eNodeB 102 comprises at least one radio 114 configured to wireless communicate with the UE 108 and at least one processor 116 configured to execute software or firmware 118 that causes the eNodeB 102 to perform at least some of the functions described here as being performed by the eNodeB 102. The software or firmware 118 comprises program instructions that are stored (or otherwise embodied) on or in an appropriate non-transitory storage medium or media 120 from which at least a portion of the program instructions are read by the programmable processor 116 for execution thereby. Although the storage media 120 is shown in FIG. 1 as being included in, and local to, the respective eNodeB 102, it is to be understood that remote storage media (for example, storage media that is accessible over a network) and/or removable media can also be used. Each eNodeB 102 also includes memory 122 for storing the program instructions (and any related data) during execution by the programmable processor 116.

Each eNodeB 102 can be implemented in other ways.

Figure 2:
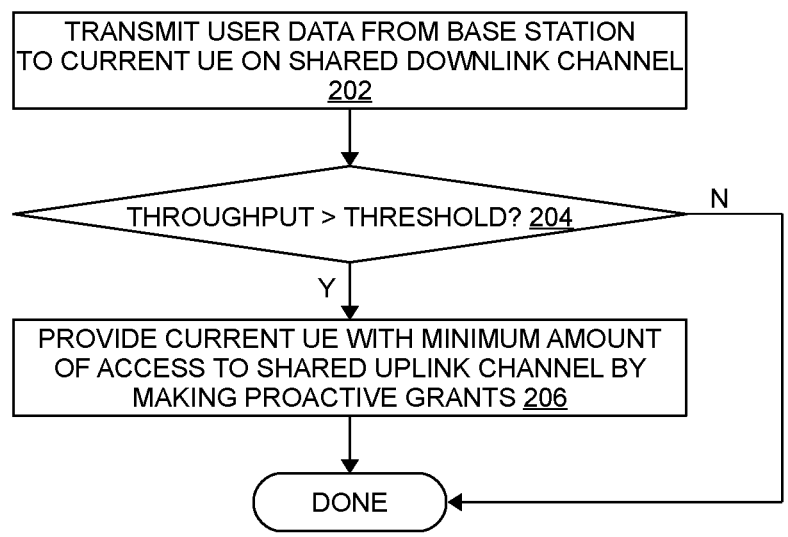
FIG. 2 is a high-level flow chart illustrating one exemplary embodiment of a method of proactively granting access to an uplink channel.

FIG. 2 comprises a high-level flow chart illustrating one exemplary embodiment of a method 200 of proactively granting access to an uplink channel. The embodiment of method 200 shown in FIG. 2 is described here as being implemented in the RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 is described here as being performed for each UE 108 when it attaches to the cell 104 and establishes an RRC connection. The particular UE 108 for which method 200 is being performed is referred to here as the "current" UE 108.

Method 200 comprises transmitting user data from the base station to the current UE 108 on a shared downlink channel (block 202).

Method 200 further comprises determining if the throughput for the user data transmitted to the current UE 108 on the shared downlink channel is greater than a threshold amount (block 204).

If the throughput for the user data transmitted to the current UE 108 on the shared downlink channel is greater than the threshold amount, the base station 102 provides the current UE 108 with a minimum amount of access to a shared uplink channel by making proactive grants of uplink resources on the shared uplink channel when necessary (block 206).

This grant of uplink resources for the shared uplink channel is "proactive" in that the base station 102 makes this grant without the current UE 108 making, and without the base station 102 receiving, a scheduling request for uplink resources. In this LTE example, the shared uplink channel comprises PUSCH, the uplink resources can include a modulation coding scheme (MCS) and physical resource blocks (PRBs) for the transmitting on the shared uplink channel, and the eNodeB 102 signals this proactive grant by transmitting an appropriate DCI0 message on the PDCCH to the current UE 108.

The minimum of amount of access to the shared uplink channel is determined as a function of the amount of time since the most recent grant of, or last SR opportunity for, uplink PUSCH resources for the current UE 108. If the current UE 108 has had a recent grant of uplink resources or has recently had an opportunity to make a SR, then it is not likely that the base station 102 will need to make such a proactive grant of uplink resources. However, if a predetermined amount of time has elapsed since the current UE 108 has had a recent grant of uplink resources or an opportunity to make a SR, then the current UE 108 is a candidate for a proactive grant of uplink resources.

The threshold amount of throughput mentioned above in connection with block 202 can be set to identify situations where there is a good chance that the current UE 108 is communicating using a TCP connection at a rate high enough that the TCP connection may be throttled. If the UE 108 has not otherwise been granted access to the uplink channel for transmitting uplink TCP user data, the UE 108 typically must wait to send a SR at its next SR transmission opportunity in order for the UE 108 to be granted access to the uplink channel in order to send TCP ACKs. As noted above, where the UE 108 is assigned a large Tsr value, the TCP ACK latency can be high enough to cause the TCP source to throttle the downlink throughput.

To avoid such throttling, the serving base station 102 can be configured to make a proactive uplink grant to the UE 108 experiencing high downlink throughput but has not had an opportunity to request, or been granted, access to the uplink channel within a predetermined amount of time. By granting the UE 108 access to the uplink channel without having to wait to send a SR at its next SR transmission opportunity in order for the UE 108 to be granted access to the uplink channel in order to send TCP ACKs, the TCP ACK latency can be reduced. The eNodeB 102 is configured to provide the current UE 108 with sufficient minimum access to the shared uplink channel in order to sufficiently reduce the resulting TCP ACK latency so as to significantly reduce likelihood that the TCP source will throttle the downlink throughput.

In response to receiving the proactive grant of uplink resources, the current UE 108 accesses the shared uplink channel using the resources specified in the proactive grant (for example, using the PRBs and MCS specified in the proactive grant). The current UE 108 accesses the uplink channel as if it had been granted access to the shared uplink channel in the "normal" manner (for example, by making a SR). For example, the current UE 108 can use access the shared uplink channel to wirelessly transmit to the base station 102 a BSR and a PHR that signals the base station 102 to make subsequent grants of uplink resources for the current UE 108 to transmit other data (such as any queued TCP ACKs).

One detailed implementation of method 200 is shown in FIG. 3.

FIG. 3 comprises a flow chart illustrating one exemplary embodiment of a method 300 of proactively granting access to the PUSCH. The embodiment of method 300 shown in FIG. 3 is described here as being implemented in the RAN system 100 of FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 is performed for each transmission time interval (TTI). The particular TTI for which method 300 is being performed is referred to here as the "current" TTI.

Method 300 comprises transmitting respective user data from the eNodeB 102 to UEs 108 on a LTE PDSCH (the shared downlink channel in this example) (block 302).

Method 300 further comprises determining, by the eNodeB 102, a respective average throughput for the respective user data transmitted on the PDSCH to each UE 108 (block 304). In this exemplary embodiment, the eNodeB 102 is configured to determine the average throughput on the PDSCH for each such UE 108 by calculating an average downlink throughput supplied on the PDSCH to that UE 108 over a predetermined number N of TTIs. This average is calculated as a moving average taken over the last N TTIs.

Method 300 further comprises determining, by the eNodeB 102, if the respective average throughput for each UE 108 exceeds a predetermined throughput threshold (block 306). For each UE 108 that has a respective average throughput that exceeds the predetermined throughput threshold, the eNodeB 102 determines the number of time transmission intervals (TTIs) that have passed since the most recent grant or scheduling request (SR) opportunity for that UE 108 for the PUSCH (the shared uplink channel in this example) (block 308). The number of TTIs that have passed since the most recent PUSCH grant or SR opportunity is also referred to here as the number of "silent TTIs."

Method 300 further comprises determining, by the eNodeB 102, which UE 108 has the largest number of silent TTIs (block 310). The largest number of silent TTIs is also referred to here as the "max silent TTIs," and the associated UE 108 is also referred to here as the "max UE 108."

If the max silent TTIs is greater than a threshold number of TTIs (block 312), the eNodeB 102 makes a proactive grant to the max UE 108 of PUSCH resources in the current TTI (block 314). In this exemplary embodiment, the eNodeB 102 makes a proactive grant to the max UE 108 of at least 1 RB on the PUSCH in the current TTI.

Otherwise, if the max TTIs is not greater than the threshold number of TTIs, no proactive grant of PUSCH resources is made in the current TTI (block 316).

Other embodiments can be implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a method performed by a base station in connection with communicating with user equipment (UE), the method comprising: transmitting user data to the UE from the base station on a shared downlink channel; determining if a throughput for the user data transmitted to the UE on the shared downlink channel is greater than a threshold amount; and if the throughput for the user data transmitted to the UE on the shared downlink channel is greater than the threshold amount, providing, by the base station, the UE with a minimum amount of access to a shared uplink channel by making proactive grants of uplink resources when necessary.

Example 2 includes the method of Example 1, wherein the user data transmitted to the UE comprises user data for a Transmission Control Protocol (TCP) connection.

Example 3 includes the method of any of the Examples 1-2, wherein the UE is provided with the minimum amount of access to the shared uplink channel to enable the UE to transmit acknowledgments on the shared uplink channel.

Example 4 includes the method of any of the Examples 1-3, wherein the proactive grant is made by the base station without the UE making, and without the base station receiving, a scheduling request for uplink resources on the shared uplink channel.

Example 5 includes the method of any of the Examples 1-4, wherein the shared downlink channel comprises a LTE Physical Downlink Shared Channel (PDSCH), and the shared uplink channel comprises a LTE Physical Uplink Shared Channel (PUSCH).

Example 6 includes the method of any of the Examples 1-5, wherein the uplink resources on the shared uplink channel comprise at least one of: a modulation coding scheme (MCS) and physical resource blocks (PRBs) for transmitting on the shared uplink channel.

Example 7 includes the method of any of the Examples 1-6, wherein the base station signals each proactive grant by sending the UE a DCI0 message on an LTE Physical Downlink Control Channel (PDCCH).

Example 8 includes the method of any of the Examples 1-7, wherein the minimum of amount of access to the shared uplink channel is determined as a function of an amount of time since a most recent grant of, or scheduling request (SR) opportunity for, the shared channel uplink for the UE.

Example 9 includes the method of any of the Examples 1-8, wherein the threshold amount of downlink throughput is set to identify situations where the UE is communicating using a Transmission Control Protocol (TCP) connection at a rate high enough that the TCP connection may be throttled; and wherein the minimum of amount of access to the shared uplink channel is provided in order to avoid throttling of the TCP connection.

Example 10 includes a method performed by a base station used to wirelessly communicate with user equipment using an LTE shared downlink channel and an LTE shared uplink channel, the method comprising: transmitting respective user data to each UE from the base station on the shared downlink channel; determining, by the base station, a respective average throughput for the respective user data transmitted on the shared downlink channel to each UE; determining, by the base station, if the respective average throughput for each UE exceeds a predetermined throughput threshold; for each UE for which the respective average throughput exceeds the predetermined throughput threshold, determining, by the base station, a number of time transmission intervals (TTIs) that have passed since a most recent grant of, or scheduling request (SR) opportunity for, uplink resources on the shared uplink channel for the UE; determining, by the base station, which UE has a largest said number of TTIs; determining, by the base station, if the largest said number of TTIs is greater than a threshold number of TTIs; if the largest said number of TTIs is greater than a threshold number of TTIs, making, by the base station to the UE associated with the largest said number of TTIs, a proactive grant of uplink resources on the shared uplink channel.

Example 11 includes the method of Example 10, wherein determining, by the base station, the average throughput on the shared downlink channel for each UE comprises calculating an average throughput supplied on the shared downlink channel to each UE over a predetermined number of TTIs.

Example 12 includes the method of any of the Examples 10-11, wherein the user data transmitted to at least one UE comprises user data for a Transmission Control Protocol (TCP) connection.

Example 13 includes the method of any of the Examples 10-12, wherein the proactive grant of uplink resources on the shared uplink channel is made to enable the UE associated with the largest said number of TTIs to transmit acknowledgments on the shared uplink channel.

Example 14 includes the method of any of the Examples 10-13, wherein the proactive grant is made by the base station without the UE associated with the largest said number of TTIs making, and without the base station receiving, a scheduling request for uplink resources on the shared uplink channel.

Example 15 includes the method of any of the Examples 10-14, wherein the shared downlink channel comprises a LTE Physical Downlink Shared Channel (PDSCH), and the shared uplink channel comprises a LTE Physical Uplink Shared Channel (PUSCH).

Example 16 includes the method of any of the Examples 10-15, wherein the uplink resources on the shared uplink channel comprise at least one of: a modulation coding scheme (MCS) and physical resource blocks (PRBs) for transmitting on the shared uplink channel.

Example 17 includes the method of any of the Examples 10-16, wherein the base station signals each proactive grant by sending a DCI0 message on an LTE Physical Downlink Control Channel (PDCCH).

Example 18 includes a base station configured to wirelessly communicate with user equipment (UE), the base station comprising: a radio configured to wirelessly communicate with the UE; at least one processor configured to cause the base station to do the following: transmit user data to the UE from the base station on a shared downlink channel; determine if a throughput for the user data transmitted to the UE on the shared downlink channel is greater than a threshold amount; and if the throughput for the user data transmitted to the UE on the shared downlink channel is greater than the threshold amount, provide the UE with a minimum amount of access to a shared uplink channel by making proactive grants of uplink resources when necessary.

Example 19 includes the base station of Example 18, wherein the user data transmitted to the UE comprises user data for a Transmission Control Protocol (TCP) connection.

Example 20 includes the base station of any of the Examples 18-19, wherein the processor is configured to cause the base station to provide the UE with the minimum amount of access to the shared uplink channel to enable the UE to transmit acknowledgments on the shared uplink channel.

Example 21 includes the base station of any of the Examples 18-20, wherein the processor is configured to cause the base station to make the proactive grant without the UE making, and without the base station receiving, a scheduling request for uplink resources on the shared uplink channel.

Example 22 includes the base station of any of the Examples 18-21, wherein the shared downlink channel comprises a LTE Physical Downlink Shared Channel (PDSCH), and the shared uplink channel comprises a LTE Physical Uplink Shared Channel (PUSCH).

Example 23 includes the base station of any of the Examples 18-22, wherein the uplink resources on the shared uplink channel comprise at least one of: a modulation coding scheme (MCS) and physical resource blocks (PRBs) for transmitting on the shared uplink channel.

Example 24 includes the base station of any of the Examples 18-23, wherein the processor is configured to cause the base station to signal each proactive grant by sending the UE a DCI0 message on an LTE Physical Downlink Control Channel (PDCCH).

Example 25 includes the base station of any of the Examples 18-24, wherein the processor is configured to cause the base station to determine the minimum of amount of access to the shared uplink channel as a function of an amount of time since a most recent of a grant of or scheduling request (SR) opportunity for uplink resources for the UE.

Example 26 includes the base station of any of the Examples 18-25, wherein the processor is configured to cause the base station to set the threshold amount of throughput to identify situations where the UE is communicating using a Transmission Control Protocol (TCP) connection at a rate high enough that the TCP connection may be throttled; and wherein the processor is configured to cause the base station to determine the minimum of amount of access to the shared uplink channel to avoid throttling of the TCP connection.

Example 27 includes a base station configured to wirelessly communicate with user equipment (UE) using an LTE shared downlink channel and an LTE shared uplink channel, the base station comprising: a radio configured to wirelessly communicate with the UE; at least one processor configured to cause the base station to do the following: transmit respective user data to each UE from the base station on the shared downlink channel; determine a respective average throughput for the respective user data transmitted on the shared downlink channel to each UE; determine if the respective average throughput for each UE exceeds a predetermined throughput threshold; for each UE for which the respective average throughput exceeds the predetermined throughput threshold, determine a number of time transmission intervals (TTIs) that have passed since a most recent of a grant of, or scheduling request (SR) opportunity for, uplink resources on the shared uplink channel for the UE; determine which UE has a largest said number of TTIs; determine if the largest said number of TTIs is greater than a threshold number of TTIs; if the largest said number of TTIs is greater than a threshold number of TTIs, make, to the UE associated with the largest said number of TTIs, a proactive grant of uplink resources on the shared uplink channel.

Example 28 includes the base station of Example 27, wherein the processor is configured to cause the base station to determine the average throughput on the shared downlink channel for each UE comprises by calculating an average throughput supplied on the shared downlink channel to each UE over a predetermined number of TTIs.

Example 29 includes the base station of any of the Examples 27-28, wherein the user data transmitted to at least one UE comprises user data for a Transmission Control Protocol (TCP) connection.

Example 30 includes the base station of any of the Examples 27-29, wherein the processor is configured to cause the base station to make the proactive grant of uplink resources on the shared uplink channel in order to enable the UE associated with the largest said number of TTIs to transmit acknowledgments on the shared uplink channel.

Example 31 includes the base station of any of the Examples 27-30, wherein the processor is configured to cause the base station to make the proactive grant without the UE associated with the largest said number of TTIs making, and without the base station receiving, a scheduling request for uplink resources on the shared uplink channel.

Example 32 includes the base station of any of the Examples 27-31, wherein the shared downlink channel comprises a LTE Physical Downlink Shared Channel (PDSCH), and the shared uplink channel comprises a LTE Physical Uplink Shared Channel (PUSCH).

Example 33 includes the base station of any of the Examples 27-32, wherein the uplink resources on the shared uplink channel comprise at least one of: a modulation coding scheme (MCS) and physical resource blocks (PRBs) for transmitting on the shared uplink channel.

Example 34 includes the base station of any of the Examples 27-33, wherein the processor is configured to cause the base station to signal each proactive grant by sending a DCI0 message on an LTE Physical Downlink Control Channel (PDCCH).

What is claimed is:

1. A method performed by a base station in connection with communicating with user equipment (UE), the method comprising:
    transmitting user data to the UE from the base station on a shared downlink channel;
    determining if a throughput for the user data transmitted to the UE on the shared downlink channel is greater than a threshold amount; and
    if the throughput for the user data transmitted to the UE on the shared downlink channel is greater than the threshold amount, providing, by the base station, the UE with a minimum amount of access to a shared uplink channel by making proactive grants of uplink resources when necessary.

2. The method of claim 1, wherein the user data transmitted to the UE comprises user data for a Transmission Control Protocol (TCP) connection.

3. The method of claim 1, wherein the UE is provided with the minimum amount of access to the shared uplink channel to enable the UE to transmit acknowledgments on the shared uplink channel.

4. The method of claim 1, wherein the proactive grant is made by the base station without the UE making, and without the base station receiving, a scheduling request for uplink resources on the shared uplink channel.

5. The method of claim 1, wherein the shared downlink channel comprises a LTE Physical Downlink Shared Channel (PDSCH), and the shared uplink channel comprises a LTE Physical Uplink Shared Channel (PUSCH).

6. The method of claim 1, wherein the uplink resources on the shared uplink channel comprise at least one of: a modulation coding scheme (MCS) and physical resource blocks (PRBs) for transmitting on the shared uplink channel.

7. The method of claim 1, wherein the base station signals each proactive grant by sending the UE a DCI0 message on an LTE Physical Downlink Control Channel (PDCCH).

8. The method of claim 1, wherein the minimum of amount of access to the shared uplink channel is determined as a function of an amount of time since a most recent grant of, or scheduling request (SR) opportunity for, the shared channel uplink for the UE.

9. The method of claim 1, wherein the threshold amount of downlink throughput is set to identify situations where the UE is communicating using a Transmission Control Protocol (TCP) connection at a rate high enough that the TCP connection may be throttled; and
    wherein the minimum of amount of access to the shared uplink channel is provided in order to avoid throttling of the TCP connection.

10. A method performed by a base station used to wirelessly communicate with user equipment using a shared downlink channel and a shared uplink channel, the method comprising:
    transmitting respective user data to each UE from the base station on the shared downlink channel;
    determining, by the base station, a respective average throughput for the respective user data transmitted on the shared downlink channel to each UE;
    determining, by the base station, if the respective average throughput for each UE exceeds a predetermined throughput threshold;
    for each UE for which the respective average throughput exceeds the predetermined throughput threshold, determining, by the base station, a number of time transmission intervals (TTIs) that have passed since a most recent grant of, or scheduling request (SR) opportunity for, uplink resources on the shared uplink channel for the UE;
    determining, by the base station, which UE has a largest said number of TTIs;
    determining, by the base station, if the largest said number of TTIs is greater than a threshold number of TTIs; and
    if the largest said number of TTIs is greater than a threshold number of TTIs, making, by the base station to the UE associated with the largest said number of TTIs, a proactive grant of uplink resources on the shared uplink channel.

11. The method of claim 10, wherein determining, by the base station, the average throughput on the shared downlink channel for each UE comprises calculating an average throughput supplied on the shared downlink channel to each UE over a predetermined number of TTIs.

12. The method of claim 10, wherein the user data transmitted to at least one UE comprises user data for a Transmission Control Protocol (TCP) connection.

13. The method of claim 10, wherein the proactive grant of uplink resources on the shared uplink channel is made to enable the UE associated with the largest said number of TTIs to transmit acknowledgments on the shared uplink channel.

14. The method of claim 10, wherein the proactive grant is made by the base station without the UE associated with the largest said number of TTIs making, and without the base station receiving, a scheduling request for uplink resources on the shared uplink channel.

15. The method of claim 10, wherein the shared downlink channel comprises a LTE Physical Downlink Shared Channel (PDSCH), and the shared uplink channel comprises a LTE Physical Uplink Shared Channel (PUSCH).

16. The method of claim 10, wherein the uplink resources on the shared uplink channel comprise at least one of: a modulation coding scheme (MCS) and physical resource blocks (PRBs) for transmitting on the shared uplink channel.

17. The method of claim 10, wherein the base station signals each proactive grant by sending a DCI0 message on an LTE Physical Downlink Control Channel (PDCCH).

18. A base station configured to wirelessly communicate with user equipment (UE), the base station comprising:
    a radio configured to wirelessly communicate with the UE;
    at least one processor configured to cause the base station to do the following:
        transmit user data to the UE from the base station on a shared downlink channel;
        determine if a throughput for the user data transmitted to the UE on the shared downlink channel is greater than a threshold amount; and
        if the throughput for the user data transmitted to the UE on the shared downlink channel is greater than the threshold amount, provide the UE with a minimum amount of access to a shared uplink channel by making proactive grants of uplink resources when necessary.

19. The base station of claim 18, wherein the user data transmitted to the UE comprises user data for a Transmission Control Protocol (TCP) connection.

20. The base station of claim 18, wherein the processor is configured to cause the base station to provide the UE with the minimum amount of access to the shared uplink channel to enable the UE to transmit acknowledgments on the shared uplink channel.

21. The base station of claim 18, wherein the processor is configured to cause the base station to make the proactive grant without the UE making, and without the base station receiving, a scheduling request for uplink resources on the shared uplink channel.

22. The base station of claim 18, wherein the shared downlink channel comprises a LTE Physical Downlink Shared Channel (PDSCH), and the shared uplink channel comprises a LTE Physical Uplink Shared Channel (PUSCH).

23. The base station of claim 18, wherein the uplink resources on the shared uplink channel comprise at least one of: a modulation coding scheme (MCS) and physical resource blocks (PRBs) for transmitting on the shared uplink channel.

24. The base station of claim 18, wherein the processor is configured to cause the base station to signal each proactive grant by sending the UE a DCI0 message on an LTE Physical Downlink Control Channel (PDCCH).

25. The base station of claim 18, wherein the processor is configured to cause the base station to determine the minimum of amount of access to the shared uplink channel as a function of an amount of time since a most recent of a grant of or scheduling request (SR) opportunity for uplink resources for the UE.

26. The base station of claim 18, wherein the processor is configured to cause the base station to set the threshold amount of throughput to identify situations where the UE is communicating using a Transmission Control Protocol (TCP) connection at a rate high enough that the TCP connection may be throttled; and
wherein the processor is configured to cause the base station to determine the minimum of amount of access to the shared uplink channel to avoid throttling of the TCP connection.

27. A base station configured to wirelessly communicate with user equipment (UE) using a shared downlink channel and a shared uplink channel, the base station comprising:
a radio configured to wirelessly communicate with the UE;
at least one processor configured to cause the base station to do the following:
transmit respective user data to each UE from the base station on the shared downlink channel;
determine a respective average throughput for the respective user data transmitted on the shared downlink channel to each UE;
determine if the respective average throughput for each UE exceeds a predetermined throughput threshold;
for each UE for which the respective average throughput exceeds the predetermined throughput threshold, determine a number of time transmission intervals (TTIs) that have passed since a most recent of a grant of, or scheduling request (SR) opportunity for, uplink resources on the shared uplink channel for the UE;
determine which UE has a largest said number of TTIs;
determine if the largest said number of TTIs is greater than a threshold number of TTIs; and
if the largest said number of TTIs is greater than a threshold number of TTIs, make, to the UE associated with the largest said number of TTIs, a proactive grant of uplink resources on the shared uplink channel.

28. The base station of claim 27, wherein the processor is configured to cause the base station to determine the average throughput on the shared downlink channel for each UE comprises by calculating an average throughput supplied on the shared downlink channel to each UE over a predetermined number of TTIs.

29. The base station of claim 27, wherein the user data transmitted to at least one UE comprises user data for a Transmission Control Protocol (TCP) connection.

30. The base station of claim 27, wherein the processor is configured to cause the base station to make the proactive grant of uplink resources on the shared uplink channel in order to enable the UE associated with the largest said number of TTIs to transmit acknowledgments on the shared uplink channel.

31. The base station of claim 27, wherein the processor is configured to cause the base station to make the proactive grant without the UE associated with the largest said number of TTIs making, and without the base station receiving, a scheduling request for uplink resources on the shared uplink channel.

32. The base station of claim 27, wherein the shared downlink channel comprises a LTE Physical Downlink Shared Channel (PDSCH), and the shared uplink channel comprises a LTE Physical Uplink Shared Channel (PUSCH).

33. The base station of claim 27, wherein the uplink resources on the shared uplink channel comprise at least one of: a modulation coding scheme (MCS) and physical resource blocks (PRBs) for transmitting on the shared uplink channel.

34. The base station of claim 27, wherein the processor is configured to cause the base station to signal each proactive grant by sending a DCI0 message on an LTE Physical Downlink Control Channel (PDCCH).

* * * * *